J. H. CHASE.
VALVE MECHANISM FOR MUSICAL INSTRUMENTS.
APPLICATION FILED DEC. 16, 1909.
1,087,901.
Patented Feb. 17, 1914.
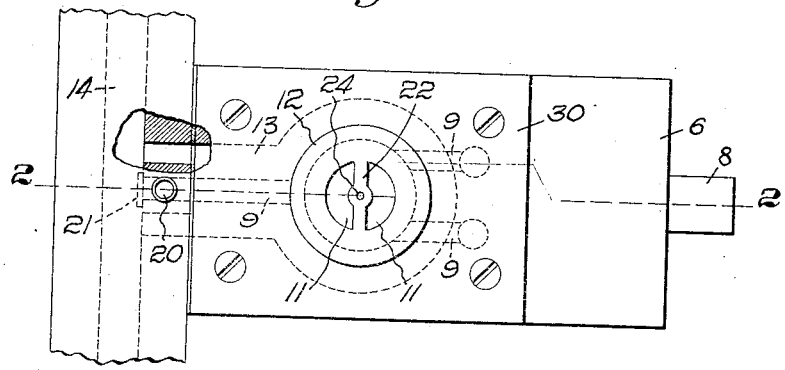
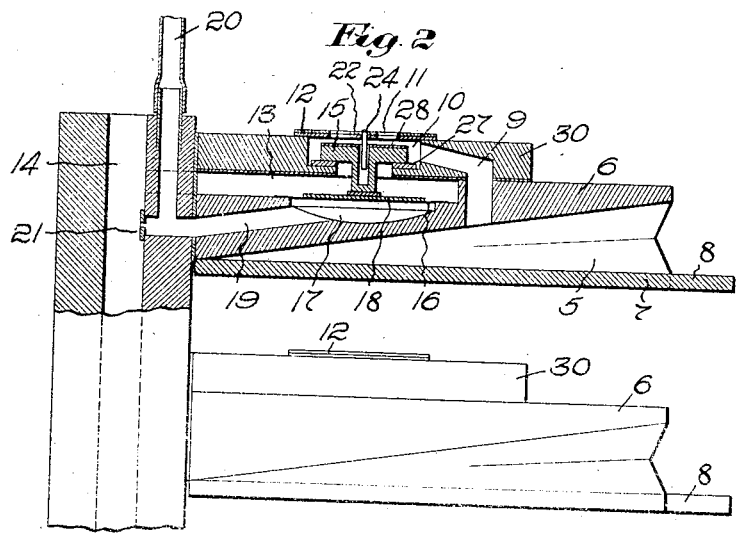
Witnesses:
Horace H. Crossman
Robert H. Hammler
Inventor:
Joseph H. Chase.
by Emery & Booth, Attys

UNITED STATES PATENT OFFICE.

JOSEPH H. CHASE, OF ROCHESTER, NEW YORK, ASSIGNOR TO AMERICAN PIANO COMPANY, OF JERSEY CITY, NEW JERSEY, A CORPORATION OF NEW JERSEY.

VALVE MECHANISM FOR MUSICAL INSTRUMENTS.

1,087,901. Specification of Letters Patent. Patented Feb. 17, 1914.

Application filed December 16, 1909. Serial No. 533,464.

*To all whom it may concern:*

Be it known that I, JOSEPH H. CHASE, a citizen of the United States, and a resident of Rochester, in the county of Monroe, State of New York, have invented an Improvement in Valve Mechanism for Musical Instruments, of which the following description, in connection with the accompanying drawings, is a specification, like letters on the drawings representing like parts.

This invention relates to pneumatic valve mechanism for musical instruments, and as described herein for illustration, it pertains more particularly to a valve mechanism for motor pneumatics.

Among other objects the invention is intended to supply a compact, simple and durable construction which may be readily assembled and disorganized for repair or replenishment of parts.

The character of the invention may be best understood by reference to an illustrative embodiment shown in the accompanying drawings, in which—

Figure 1 is a plan view of a motor pneumatic and associated valve mechanism; and Fig. 2 is a side elevation of two motor pneumatics one of them being shown in section on the line 2—2 of Fig. 1.

The illustrative pneumatic 5 has a stationary board 6 and movable board 7 provided with an extension 8 to engage an abstract or other device not necessary to be shown. A duct 9 leading from the interior of the pneumatic 5 communicates with a valve chamber 10 having a cap plate 12 provided with ports 11 open to atmosphere. The valve chamber 10 also communicates with an exhaust chamber 13 which leads to an exhaust chest 14. Positioned in the chamber 10 is a double acting valve 15 adapted in the position shown in Fig. 2 to close communication between the chamber 10 and exhaust chamber 13. The depending stem of the valve rests normally upon or near a diaphragm 16 over a chamber 17. Said diaphragm may have a reinforcing disk or disks 18. A duct 19 leads from the chamber 17 to a second duct 20 which may be controlled by a primary valve or otherwise, or may lead direct to a tracker vent. The duct 19 has a bleeder vent 21 in the exhaust chest 14.

The valve 15 is proportioned to close the ports 11 of the cap plate 12 to cut off atmosphere from the duct 9 when the valve is held in its uppermost position by the presence of atmosphere in the chamber 17 distending the diaphragm 16. Depending from a support 22, which may be integral with the cap plate 12, is a valve governing pin 24, which projects downwardly into the hollow stem of the valve 15. The pin receiving socket in the valve stem is preferably substantially larger than the pin 24, whereby the valve is permitted to revolve and tip slightly so as to insure proper contact with its respective seats. A felt or other washer 27 may be interposed between the valve and its lower seat, as by being glued to the seat; and a felt or other washer 28 may be interposed between the valve and its upper seat against the cap plate 12, as by being cemented or otherwise mounted upon the valve.

With the described construction, admission of atmosphere to the ducts 20 and 19 and the chamber 17, distends the diaphragm 16, elevates the valve 15 and closes the ports 11 in the cap plate 12, thereby shutting off atmosphere from the duct 9 and pneumatic 5, and opening communication between the duct 9 and exhaust chamber 13, whereby the pneumatic is immediately collapsed.

The cap plate 12 may be glued or cemented in place, preferably so as to be readily removable. The mouth of the chamber 10 which is covered by the cap plate 12, is preferred to be sufficiently large to permit withdrawal of the entire valve 15, and also permit exposure of the lower seat of the valve if it be desired to renew the felt 27 or its substitute.

This ready accessibility of different parts of the valve mechanism is of substantial advantage as will appear to those skilled in the art. Furthermore, the described arrangement of the double acting valve and its governing pin 24 is highly desirable in that the valve is permitted free and substantially frictionless movement while being effectively governed and centered by the pin 24. As already pointed out, the pin is received loosely by the described socket in the valve stem so as to avoid friction and to leave the valve free to tilt more or less and to accommodate itself to its respective seats. The described construction has further advantages which will appear to those familiar in the art.

The described chambers and the valve mechanism are preferably mounted closely adjacent to the pneumatic 5 as by having one or more of said chambers formed in the stationary board 6 or in a board 30 or in both.

It is to be understood that the invention is by no means limited to the specific embodiment shown merely for illustration in the drawings. The described relative positions of the parts are convenient for description and explanation, but the invention is not essentially limited thereto.

Claims—

1. In a pneumatic valve mechanism for musical instruments, the combination of a casing; an annular valve seat removably mounted thereon; a valve having an aperture therein; and a governing pin mounted on and removable with said valve seat, and projecting loosely into the aperture of the valve permitting the latter to rock relatively to said pin and accurately seat itself without hindrance therefrom.

2. In a pneumatic valve mechanism for musical instruments, the combination of a valve having an aperture therein; a casing providing a chamber for said valve having an open mouth through which said valve may be removed and providing also a duct communicating with said chamber; a removable plate at the open mouth of said valve chamber and having a valve seat thereon and removable therewith; and a guide pin projecting from said removable plate into the aperture of the valve.

3. In a pneumatic valve mechanism for musical instruments, the combination of a stationary board with a power pneumatic having an open chamber 13 formed therein; of a second board 30 mounted on the first board inclosing said chamber 13, said board 30 having therein an open sided chamber 10; a valve seat 27 in the latter; a valve having an aperture therein; a guide pin projecting into said aperture to guide the valve; and a support for said pin comprising a plate removably mounted on said second board and constituting a second valve seat for said valve.

4. In a pneumatic valve mechanism for musical instruments, the combination of a stationary board 6 for a power pneumatic and having a duct 9 therein; a second board 30 mounted on the first board 6 and having therein a continuation of said duct 9 and also a valve chamber communicating with said duct 9; a valve having an aperture therein; a valve seat 27 provided on said board 30 in said chamber and a plate 19 providing a valve seat and having a pin 24 to enter the aperture in the valve.

5. In a pneumatic valve mechanism for musical instruments, a wedge shaped stationary board for a power pneumatic having a diaphragm chamber and a wind chest formed therein; a diaphragm separating said chamber and chest; a second board mounted on said stationary board and providing one wall of said wind chest, said second board having a valve chamber bored therein; an apertured valve in said chamber; a thin plate partially covering said chamber and supplying a seat for said valve; and a pin projecting from said plate into the valve.

In testimony whereof, I have signed my name to this specification, in the presence of two subscribing witnesses.

JOSEPH H. CHASE.

Witnesses:
ROBT. H. WADD,
CHAS. A. KASSELL.